(No Model.)　　　　　　　　　　　　　　　　　　　　　　2 Sheets—Sheet 1.
H. NIEMANN.
CAR COUPLING.
No. 437,790.　　　　　　　　　　　　　　　　Patented Oct. 7, 1890.
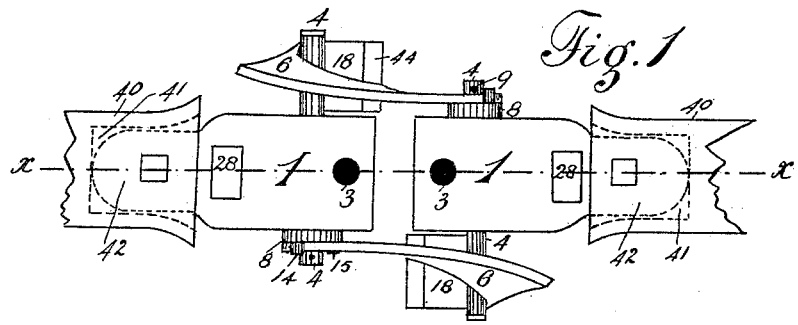
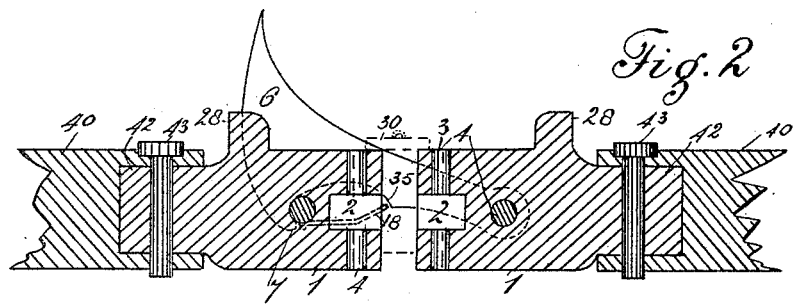
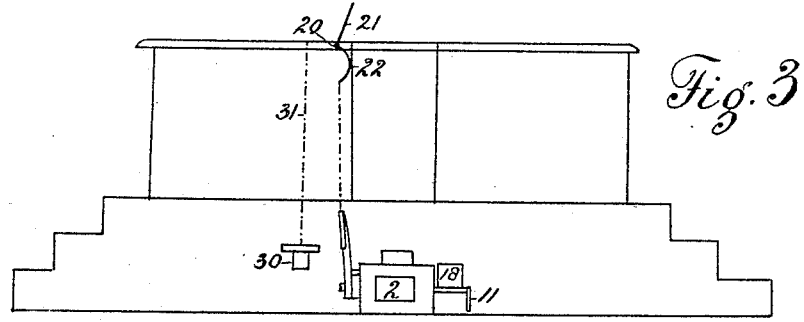
WITNESSES:　　　　　　　　　　　　　　　　　　INVENTOR
　　　　　　　　　　　　　　　　　　　　　　　　Henry Niemann
　　　　　　　　　　　　　　　　　　　　　BY
　　　　　　　　　　　　　　　　　　　　　　　ATTORNEY.

(No Model.) 2 Sheets—Sheet 2.
H. NIEMANN.
CAR COUPLING.
No. 437,790. Patented Oct. 7, 1890.
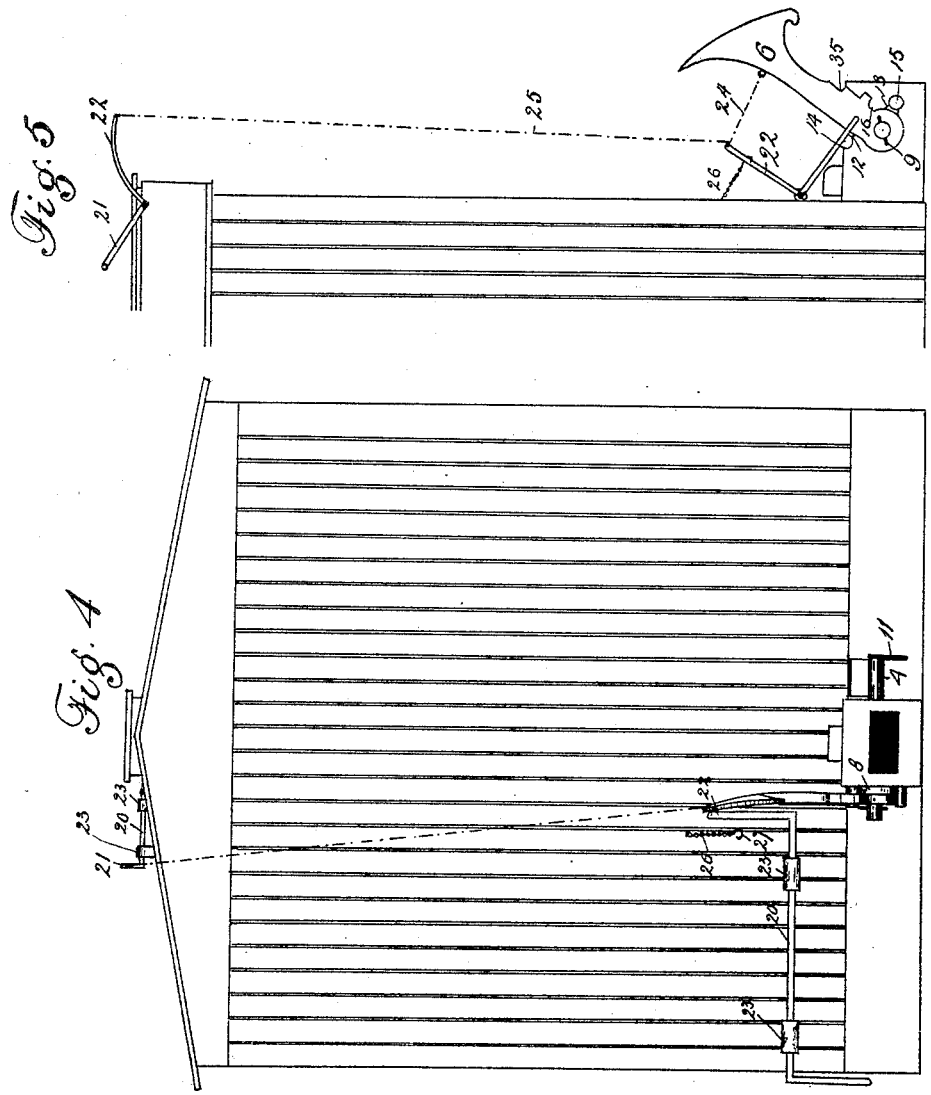
WITNESSES:
John Weston
Wm. McConnell
INVENTOR
Henry Niemann
BY H. J. O'Brien
ATTORNEY.

UNITED STATES PATENT OFFICE.

HENRY NIEMANN, OF DENVER, COLORADO.

CAR-COUPLING.

SPECIFICATION forming part of Letters Patent No. 437,790, dated October 7, 1890.

Application filed May 20, 1890. Serial No. 352,450. (No model.)

*To all whom it may concern:*

Be it known that I, HENRY NIEMANN, a citizen of the United States, residing at Denver, in the county of Arapahoe and State of Colorado, have invented certain new and useful Improvements in Car-Couplers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in car-couplings for railway-cars; and the object of my invention is to provide a coupling of the class stated which shall be automatic in action, durable, reliable, and effective in operation, a coupling simple in construction, economical in cost, and not liable to get out of repair, being at the same time applicable either to freight-cars or to passenger-coaches.

To these ends my invention consists of the features, arrangements, and combinations hereinafter described and claimed.

In the drawings is illustrated an embodiment of the invention, in which drawings—

Figure 1 is a plan view of the device, showing the position of the parts when two contiguous cars are provided with my invention and coupled. Fig. 2 is a longitudinal section taken on the line x x, Fig. 1. Fig. 3 is an end view of the device attached to a passenger-car, showing the coupling-bar raised. Fig. 4 is an end view of a freight-car provided with my improvement, the coupling-bar being also uplifted. Fig. 5 is a side view of the same.

In the views, let the reference-numeral 1 indicate the coupling-heads of the draw-bar 40, secured to the frame-work of the car in any suitable manner or in the ordinary way. Each draw-bar is provided with a socket or recess 41, formed in its outer extremity for the reception of the outer extremity 42 of its corresponding coupling-head. This part 42 of the coupling-head is fashioned to fit loosely within its socket or so that it may turn therein in passing around curves, the object being to subject each coupling-bar 6, hereinafter described, to the same tensile strain as the train is turning, since without this provision one coupling-bar would be relieved from strain while the strain on the other similar bar of each pair would be increased to a corresponding degree in turning a curve. The extremity 42 of the coupling-head is retained with its socket in the draw-bar by the use of a coupling-bolt 43, passing through a suitable aperture formed for the purpose through the engaging parts of the draw-bar and coupling-head.

Each coupling head of two contiguous cars is provided with a link-recess 2 and an aperture 3 for the reception of a coupling-pin. It will thus be seen that the coupling-heads provided with my improvement are so constructed that the cars to which they are attached may be coupled in the ordinary way—that is, by the use of a link and coupling-pin—if at any time an emergency should exist therefor, as in case it should be necessary to couple two cars, one provided with my improvement and the other having only an ordinary draw-head. To one extremity of these pins 4, and on the outside of each coupling-head, is rigidly secured a coupling rod or bar 6, formed with hook ends 7 on the under side of its forward or free extremity.

Surrounding pin 4, between the coupling-bar and the coupling-head, is the plate 8. This plate is rigidly secured to or is formed integral with the coupling-head, and its body portion is about the size of the rear extremity of the coupling-bar, with which it is in contact, and it is provided with short arms 12 and 13, provided with the outwardly-projecting lugs 14 and 15, respectively.

Wrist 14 is so located that it prevents the bar 6 when uncoupled from passing so far back that it would not return by its own gravity to the coupling position, while wrist 15 supports the bar from below in a position ready to make an automatic coupling.

Passing through an aperture in the lower extremity of the pin 4 is a key 9, retaining the bar 6 at all times securely in place thereon. The opposite extremity of bar 4 projects sufficiently beyond the coupling-head to engage the hooked or free forward extremity of the coupling-bar, secured to the pin 4 on the opposite coupling-head, is turned upwardly so as to occupy a vertical position, as shown at 11, in order to prevent the hook from slipping over the engaging extremity of the pin or uncoupling. This extremity of each pin 4 is provided with a cam 18, which when in the upright position is of sufficient length to raise the hooked extremity of the coupling-bar from engagement with its corresponding pin 4. Cam 18 is rigidly secured to its pin and turns therewith. The outer portion 44 of these cams is preferably upturned, as shown by dotted lines in Fig. 2. The object of these cams is to enable a person to uncouple or disconnect the cars without going between them and therefore without danger. This is accomplished in the case of freight-cars by a person either standing on the ground or on top of the car. In either case the train-man manipulates the lever consisting of a horizontal bar 20 and arms 21 and 22, extending at right angles thereto. One of these levers or cranks is secured to the end of the car and within easy reach of a person standing upon the ground without going between the cars and the other to the top of the car, and both are supported or held in place by and capable of turning freely within boxes or sleeves 23, secured to the car, as shown.

A short chain 24 is secured at one extremity to the upper edge of the coupling-bar and is made fast at the other extremity to arm 22 of the lever on the end of the car, and another chain 25 connects arm 22 on the top of the car with the arm of the same name on the end thereof.

The hooked extremities of the coupling-bars turn outwardly slightly to insure perfect automatic action in engaging the pins 4. By the use of either of arms 21—one on the end and the other on the top of the car—both coupling-bars are raised simultaneously, one by the direct action of the levers connected with the bar, as aforesaid and the other by the action of the cam 18, secured to the bar acted upon directly by the lever, since as the lever turns the cam assumes an upright position and lifts the opposite bar from engagement with pin 4.

Each coupling-bar 6 is provided with a small recess 35, into which the cam 18 slips after having raised the bar sufficiently to disengage the hooked end from the pin 4. By this means the cam and the coupling-bar which it engages are held in the upraised position until the cars are separated by drawing one from the other. This may be some time, and the engagement of the cam with the recess 35 obviates the necessity of a person remaining there to hold the coupling-bar in the upraised position until the engine starts and separates the cars.

When not in use, the coupling-bar may be retained in the upraised position, as shown in Fig. 5, by means of a short chain 26, secured to the car at one extremity and provided with a hook 27 at the opposite extremity, conveniently located for grasping arm 22 and supporting the lever.

The means of operating lever 20 for the purpose of disconnecting the cars when used on passenger-cars is similar to that employed in operating the device on freight-cars, as just described, except that in the case of a passenger-coach the train-man stands on the platform instead of on top of the car while manipulating the lever. This is illustrated in Fig. 3, where the corresponding parts are indicated by the same reference-numerals as in Fig. 4.

It will be readily observed that my improved coupler may be attached to the ordinary draw-head of either passenger-coaches or freight-cars with but little change, and consequently with small expense, having this important advantage over those couplings requiring for their use the manufacture of complete new draw-heads.

A very important feature of my improved device is the solid or practically solid draw-head or coupling-head, adding strength and durability to the parts and contributing largely to the advantage first mentioned—namely, ease and facility of attaching my improvement to draw-heads of cars equipped in the ordinary way.

28 is a stop-block, secured or formed integral with the top of the rear portion of the coupling-head to prevent the coupling from slipping beyond a point where the block engages the front end of the car in case the spring or other device located at the rear extremity of the draw-bar should give way or become useless.

30 is a plug for use on passenger-coaches, and is designed to fit between and tighten the draw-heads, as shown in Fig. 2. The object of this block is to avoid unnecessary jerking in starting or stopping the train. This plug is suspended or conveniently secured to the car by means of a chain 31, and may be dropped into position or removed therefrom at pleasure.

Having thus described my invention, what I claim is—

The combination, with a draw-head, of a coupling-bar 6, pivoted to the outside of the draw-head and provided with a hook end 7, and a shallow recess 35, a pin 4, provided with a cam 18, and suitable means of raising cam 18 and disengaging the coupling-bars from pin 4, said cam being adapted to engage recess 35 and maintain the connecting parts in the upraised position, substantially as described.

In testimony whereof I affix my signature in presence of two witnesses.

HENRY NIEMANN.

Witnesses:
WM. MCCONNELL,
FRED. W. FELDWISCH.